Nov. 13, 1962
W. GFÖLL
3,063,463
COMBINED PROTECTING CAP AND PRESSURE
GAUGE ASSEMBLY FOR TIRE VALVES
Filed Aug. 17, 1959
3 Sheets-Sheet 1
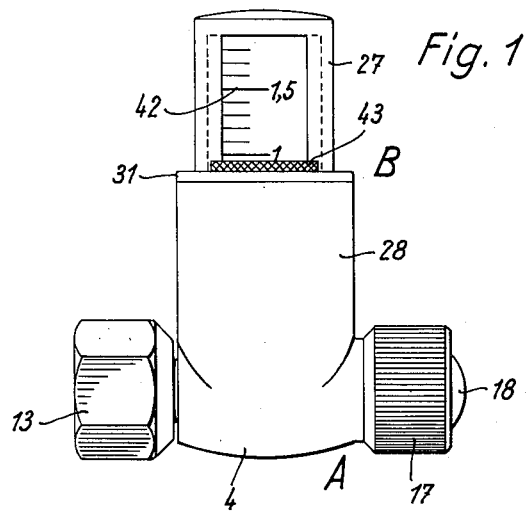
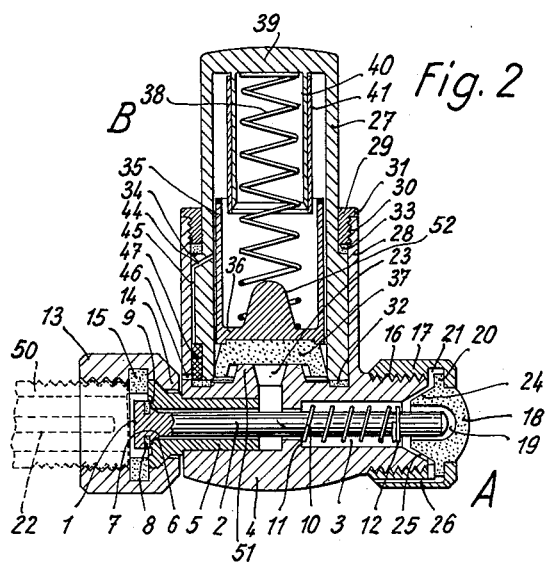
Inventor:
Walter Gföll
by:
Michael S. Striker
Attorney Nov. 13, 1962

W. GFÖLL 3,063,463

COMBINED PROTECTING CAP AND PRESSURE
GAUGE ASSEMBLY FOR TIRE VALVES

Filed Aug. 17, 1959

Inventor:
Walter Gföll
by:
Michael S. Striker
Attorney

United States Patent Office 3,063,463
Patented Nov. 13, 1962

3,063,463
COMBINED PROTECTING CAP AND PRESSURE
GAUGE ASSEMBLY FOR TIRE VALVES
Walter Gföll, Freiburg im Breisgau, Germany
(Hauptstrasse 37, Alsenborn, Pfalz, Germany)
Filed Aug. 17, 1959, Ser. No. 834,012
Claims priority, application Germany Aug. 16, 1958
5 Claims. (Cl. 137—228)

The invention relates to a protecting cap for the air valve of the tires of vehicles, particularly motor vehicles, which is constructed at the same time as a pressure gauge and contains means which can be depressed for opening the tire valve and thereby enable the inner space of this cap to act as a pressure chamber. This chamber accommodates an element adjustable according to the air pressure prevailing therein against the action of a spring, which element indicates the tire pressure on a scale which can be read from the outside through a window provided in the cap. In the path through which the compressed air has to pass from the tire valve to the measuring chamber, a control valve is provided in front of the above-mentioned tire valve and must be separately operated before taking a measurement to open the tire valve.

The object of the invention is to improve this measuring cap in such a manner that it need not be removed for re-inflating the tire but allows the air to pass through the protecting cap into the tire without in any way affecting its measuring part or the inflation. When the tire is filled with air, the measuring part of the protecting cap serves as checking indicator for the manometer of the filling apparatus during the filling or inflating operation and even thereafter or both before and also after the inflation of the tire.

The improvement aimed at also relates to the possibility of enabling air to escape through the cap, as in the case of a conventional tire valve, if the air pressure prevailing in the tire is too high, whereby a check reading is always immediately available.

Also from a purely constructional point of view, the invention represents an improvement in that all outer parts are rigid and immovably arranged, with the result that a particularly good hermetic sealing is attained by the cap. At the same time, the reduction in length of this cap should also be mentioned as well as its position in the rim bed where it is always protected and easy to read and also the fact that it can be fitted so that it is secure against theft.

The invention provides a protecting cap for air valves of the tires of vehicles, particularly motor vehicles, constructed as pressure gauge and containing means capable of being depressed in order to open the tire valve and thereby allowing an internal space in this cap to act as a pressure chamber in which an element is shiftable against the bias of a spring to indicate the air pressure actually existing in the cap, which element indicates the tire pressure on a scale readable through a window, whereby in the path for the air under pressure from the tire valve to the measuring chamber a control valve comprising a stem with an enlarged head and opening with the tire valve is provided, said protecting cap comprising a connection piece for an inflating apparatus which enables the tire to be filled with air while the cap remains fitted ready for measuring.

A particularly advantageous form of construction is attained when the path for the introduction of air extending through the valve protecting cap runs along the stem of the control valve and the measuring part communicates with and extends laterally from this path. Thereby a body accommodating the stem of the control valve guided by means of a bore, can be provided with a lateral connection piece for the measuring part of the cap. In a preferred form of construction said body is integral with the connection piece, whereby a particularly strong but simple construction which is cheap to produce is obtained.

Several preferred embodiments of the invention will now be described by way of example and with reference to the accompanying drawings, in which FIG. 1 is a side elevation of a valve cap according to the invention;

FIG. 2 is a central longitudinal section through FIG. 1;

Figure 3:
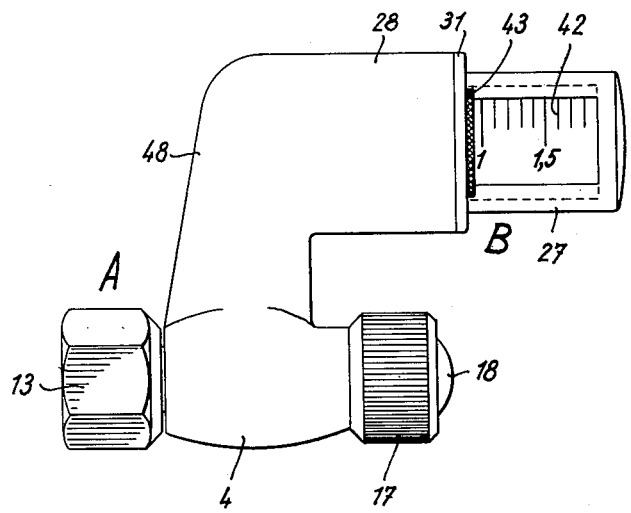
FIG. 3 is a view similar to FIG. 1 but showing a modified form of construction of the valve cap according to the invention.

In the valve cap or combined protecting cap and pressure gauge assembly according to the invention there are two parts which fulfill their functions without interfering with each other, namely the part A, which contains a control valve and through which defines the path for the introduction of air and a measuring part or pressure gauge B by means of which the air pressure in the tire is indicated.

In the valve cap illustrated in FIGS. 1 and 2, the control valve has a valve head 1 with a stem 2 which extends through a bore 3 of a body 4 which accommodates it along its entire length. This bore 3 has in its left-hand portion in FIG. 2 a brass sleeve 5 which guides the stem 2 during its longitudinal movement. This sleeve 5 has at an outwardly directed mouth a conical surface 6 which acts as a means for centering the valve head 1 provided with a conical surface 7 for this purpose. The valve face consists of an elastic annular disk 8 fitted in the head 1 and which is tightly pressed against an annular projection 9 formed on the end face of the sleeve 5 and provided with an edge.

The automatic tight sealing of the control valve is effected by a spiral spring 10 on the valve stem 2. This spring 10 bears at one of its ends against a shoulder 11 in the bore 3 of the body 4 also serving for guiding the stem 2. At its other end this spring 10 bears against a disk 12 which is rigidly connected to the stem 2, for example by a pin, spring ring or the like. Thus, the control valve is pressed tightly against its seat.

The valve cap body 4 is screwed on to a connection piece 50 of the tire valve. For this purpose a cap nut 13 is provided which engages behind the widened head of the sleeve 5 with its narrowed end 14 so that it can be turned in relation to the sleeve 5 without any danger of its becoming lost. The nut 13 may be hexagonal and can be pressed tightly against the connection piece 50 with the aid of a spanner. Consequently the entire valve cap cannot be loosened by hand without the aid of a tool. The connection piece 50 thereby presses with its mouth against a packing ring 15 fitted in the nut 13, which ring at the same time presses against the end face of the widened head of the brass sleeve 5 and thus constitutes an absolutely dust- and air-tight seal.

At its other free end the body 4 has an external screw-thread 16. An externally knurled closing cap 17 is screwed on to this screw thread 16. This cap 17 has an insert 18 capable of being pressed inwardly and preferably made of elastic material. This insert has an inner recess 19 in which the rear end of the valve stem 2 fits. This insert 18 also has on its outer side a flange-like edge 20 which engages in an annular groove 21 which is cut in the inner wall of the cap 17 to such a depth that when the insert 18 is pressed inwardly, the valve stem 2 is also shifted so far that the valve head 1 can shift a release pin or stem 22, shown in dotted lines in FIG. 2, of the tire valve, the connection piece 50 of which is screwed on to the valve cap in the manner described. Thus, the control valve mounted on the measuring cap is opened, by lifting its head 1 from the valve seat, and also the actual tire valve, so that the air at the pressure prevailing in the tire can enter the bore 3 of the measuring cap and pass into a passage 23 leading to the measuring part B thereby producing a reading measurement, in the manner hereinafter described.

The insert 18 in the closing cap 17 tapers inwardly in the form of a cone 24. This cone bears against a corresponding conical surface 25 formed in the cap body 4 when the insert 18 is pressed inwardly. There is a good tight connection between the measuring cap and the insert 18 as long as the insert is pressed to obtain a measurement reading to control the air pressure of the tire. The air pressure acts directly only on the relatively very small end surface of the cone 24 so that the insert 18, even in the case of high tire pressure, can easily be held pressed inwardly with one finger. By the cone sealing above-described any undesired passage of air into the closing cap 17 is prevented.

The exhaust or venting of the air both from the bore 3 and also from the passage 23 as well as the lower part of the measuring part B is effected on the release of the depressed insert 18 in that the annular groove 21 in the closing cap 17 is in communication with the atmosphere by means of a longitudinal groove 26. This venting path becomes free as soon as the measuring operation is terminated and the insert 18 again assumes its initial or inoperative position shown in FIG. 2.

The measuring part B of the valve measuring cap consists of a cylindrical cap 27 completely closed on the outer side and at least the upper part of which is transparent. This cap 27 is fitted in a lateral tubular connection piece 28 which is made in one piece with the body 4. In this manner the body 4 together with the connection piece 28 forms an angle or T-piece.

The cap 27 is held in the connection piece 28 by force fit. This is effected by a screw sleeve 29 which is provided with an external screw thread and is screwed with the aid of this screw thread into an internal screw thread 30 at the upper end of the connection piece 28 whereby an external flange 31 on the screw sleeve 29 lies flush with the connection piece 28 and bears tightly against the end face thereof. The diameter of the cap 27 is slightly larger in its lower part than in its upper part so that it with its lower part bears against the inner wall of the connection piece 28. At its lower end the cap 27 rests on a packing ring 32 which is placed in an annular groove of the body 4. A packing ring 33 is also provided between the sleeve 29 and an extension 34 of the cap 27. The two packing rings 32 and 33 ensure good and reliable sealing of the cap 27 in outward direction.

Inside the cap 27 is an element 35 which embodies the actual measuring element and is likewise made of transparent material. It is in the shape of a pot open at the top and carries underneath its bottom 36 a packing sleeve 37. This sleeve rests with its end face on a projecting portion 51 of the body 4 so that the sleeve does not bear at its lip edge which is consequently conserved.

The sleeve 37 is loaded from below by the pressure of the air coming out from the tire and passing through the passage 23. This sleeve 37 presses the measuring element upwardly a distance corresponding to the air pressure to be measured against the force exerted by a spring 38. A cylindrical sleeve 40 projects downwardly from the inner side of the top 39 of the cap 27 with which it is made in one piece and this sleeve serves as support and guide for the upper end of the spring 38, which is guided and supported at its lower end by a protrusion 52 formed on the inner side of the bottom of the measuring element 35. A cylindrical sleeve or shell 41 is slipped over the sleeve 40 and carries a measuring scale 42.

The actual indication of the measurement is effected by an upper edge 43 of the measuring element 35. This edge may be colored, being formed, for example, by a red stripe so as to render the position of the measuring element 35 clearly and easily legible. The measuring element 35 itself can also be made entirely of transparent plastic material which likewise contributes to improving the reading of the measurements indicated.

The spring 38 of the above-described valve measuring cap is of such strength that it corresponds to an air pressure to be measured within the range of about 1 to 2 atmospheres, which is appropriate for the usual average tire pressure of 1.5 atm. for automobiles. However, by using a spring 38 of a different strength and exchanging the scale, it is possible to measure any other pressure values, for example from 0.0 to 7.0 atmospheres, whereby the lower range comes into question in the case of motor cycles and the upper range in the case of motor lorries.

In carrying out the pressure checking in the manner described it is necessary that the measuring part B can itself be quickly vented. For this purpose a transverse bore 44 is provided in the wall of the cap 27 and extends in the form of a longitudinal groove 45 leading to the foot of the connection piece 28 where it joins a bore 46 leading outwardly through the wall of the connection piece at a point located in a protected position within the range of the cap nut 13. Behind the bore 46 a felt-like insert 47 penetrable by air is provided in an enlargment of the longitudinal groove 45 and effects a filtration of the air, chiefly air sucked in from the atmosphere, which enters the bore 46 when the measuring element, after measurement has been taken, is pushed back into its initial or inoperative position shown in FIG. 2, by the spring 38. The air displaced in the measuring part B during the measuring operation flows back inwardly through the bore 46, the groove 45 and the transverse bore 44 above described.

If it is necessary to fully inflate a partly inflated tire, this can be effected through the above-described valve cap which remains screwed on the valve connection piece 50 during the operation. For this purpose it is then merely necessary to unscrew the closing cap 17 and to connect the valve body with a source of compressed air in the usual manner. By the manipulation of this source, the valve stem 2 is pressed inwardly with the result that the control valve 1 and the tire valve open. This enables the replenishment of air to be carried out in the usual manner. The air introduced then flows through the bore 3 into the tire because in this bore there is sufficient clearance for its passage along the stem 2. If the replenishing is interrupted it is possible to read the air pressure prevailing in the tire on the pressure gauge of the source of compressed air in the usual manner. However, the measuring part of the valve cap also indicates this air pressure as a check, seeing that the measuring element 53 is also loaded. Thus, the existing air pressure, when the source of compressed air is connected with the valve measuring cap, can be continually controlled and checked before starting to inflate a tire, at intervals during the inflation and when the inflation is terminated. When the source of compressed air is removed, the closing cap 17 is screwed on again. The valve measuring cap described can now fulfil its dual purpose, namely merely as a dust cap and also as a measuring element as soon as the insert 18 in the closing cap 17 is pressed with one finger for this purpose.

Figure 4:
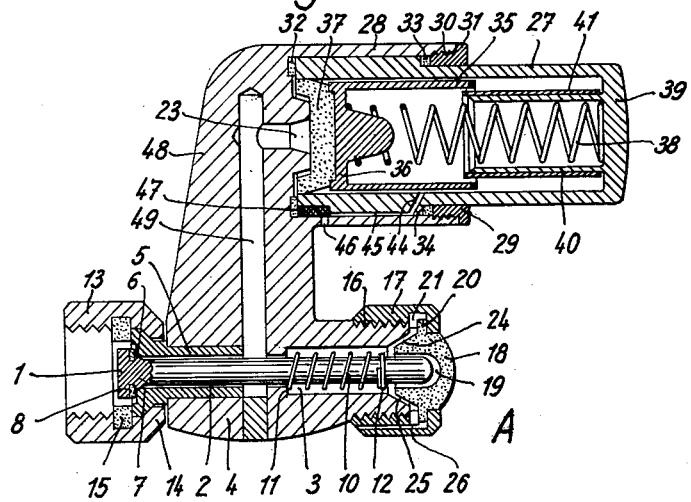
FIG. 4 is a central longitudinal section through FIG. 3.

The construction illustrated in FIGS. 3 and 4 differs from that above described merely in that the measuring part B is parallel to the axis of the valve stem 2. The connection piece 28 has in this case an intermediate part 48 with a bore 49 leading to the passage 23 which serves for giving access for the air to act on the under side of the sleeve 37. The construction shown in FIGS. 3 and 4 comes into question, for example, for use on the inner wheel for twin-tires of lorries, so that the measuring scale can be more easily read from outside.

Figure 5:
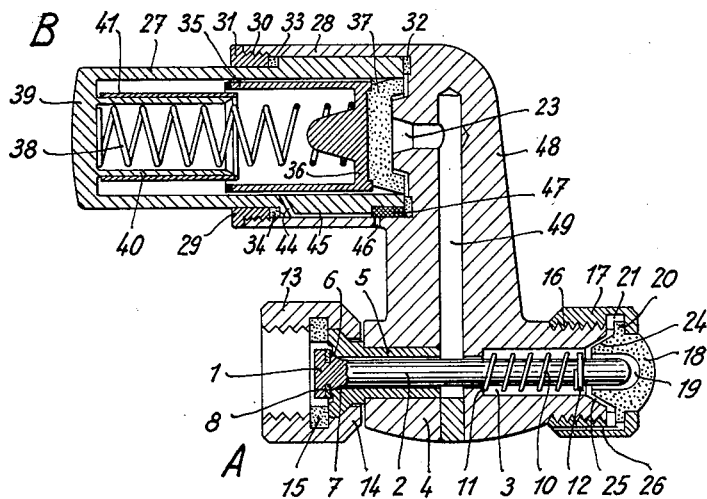
FIG. 5 is a central longitudinal section through another modified form of construction of the valve cap according to the invention.
Figure 6:
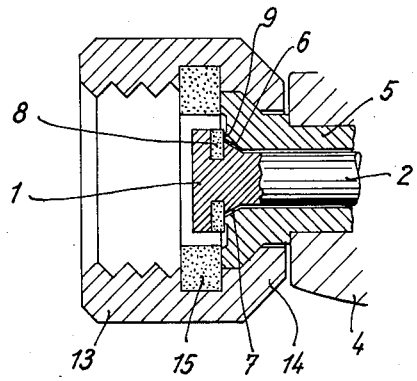
FIG. 6 is an enlarged partial section through the safety valve of the valve cap.

The construction illustrated in FIG. 5 differs from that shown in FIGS. 3 and 4 only in that the measuring part B is parallel to the part A of the valve cap and points in the direction of the tire valve. This construction comes preferably into question for the outer wheel in the case of lorry twin tires or generally for standard lorry tires.

In all cases the valve measuring cap can be so fitted that it lies protected within the rim bed and is not likely to become damaged by curbstones and loose stones. Its size corresponds to the ordinary size of the dust caps hitherto employed and its weight is not greater so that it can cause no material unbalance for a wheel rotating at a high speed. The material selected for its production is preferably a non-corroding light metal such as aluminum, in as far as transparent high-grade plastic substance is not preferred for the individual parts. The packings are also preferably made from high-grade synthetic rubber so that the valve measuring cap is capable of rendering long service, is perfectly sealed and will always indicate exact measurements.

A particularly important feature of the invention is also the separation which exists on the one hand for the part of the valve which serves not only as dust protecting packing but also in addition as airtight packing and on the other hand for the part effecting the measuring. These parts are separately secured by their own springs and are not connected with any other movable parts. Loss of air in the event of tire valve leakage is impossible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A structure of the character described comprising, in combination, a tire valve including a first valve member shiftable between a valve opening and a valve sealing position; and a combined protecting cap and pressure gauge assembly, said assembly comprising a valve body having a first end connected with said tire valve, an externally threaded second end, and defining therewithin a path for the flow of air between said first end and said second end, a control valve including a second valve member received in said valve body and reciprocable in said path between an open first position in which it shifts said first valve member to said valve opening position and a sealing second position in which it permits said first valve member to return to said valve sealing position, first resilient means mounted in said valve body for permanently biasing said second valve member to said second position, hand-actuated means comprising an internally threaded closing cap normally screwed onto the second end of said valve body and including a yieldable insert consisting at least in part of an elastic material and having a conical portion adapted to move against a conical seat formed in said valve body when the insert is depressed by hand to move said second valve member to said first position against the bias of said resilient means, said closing cap removable from said valve body to permit the latter's connection to a source of compressed air so that air may flow in said path for shifting said first valve member to said valve opening position, and a pressure gauge comprising an extension connected with said valve body and including an at least partially transparent member, an element reciprocably received in said extension and having a side exposed to the action of compressed air in said path whereby said element may be moved by compressed air in a first direction, second resilient means for permanently biasing said element in a second direction counter to said first direction, and scale means provided on said transparent member for indicating the position of said element and for thereby indicating the air pressure prevailing in said path when the second valve member shifts said first valve member to said valve opening position.

2. A structure of the character described comprising, in combination, a tire valve including a first valve member shiftable between a valve opening and a valve sealing position; and a combined protecting cap and pressure gauge assembly, said assembly comprising a valve body having a first end connected with said tire valve, an externally threaded second end, and defining therewithin a path for the flow of air between said first end and said second end, a control valve including a second valve member received in said valve body and reciprocable in said path between an open first position in which it shifts said first valve member to said valve opening position and a sealing second position in which it permits said first valve member to return to said valve sealing position, first resilient means mounted in said valve body for permanently biasing said second valve member to said second position, hand-actuated means comprising an internally threaded closing cap normally screwed onto the second end of said valve body and including a yieldable insert adapted to move said second valve member to said first position against the bias of said resilient means, said closing cap removable from said valve body to permit the latter's connection to a source of compressed air so that air may flow in said path for shifting said first valve member to said valve opening position, and a pressure gauge comprising an extension connected with said valve body and including an at least partially transparent member, an element reciprocably received in said extension and having a side exposed to the action of compressed air in said path whereby said element may be moved by compressed air in a first direction, second resilient means for permanently biasing said element in a second direction counter to said first direction, and scale means provided on said transparent member for indicating the position of said element and for thereby indicating the air pressure prevailing in said path when the second valve member shifts said first valve member to said valve opening position.

3. A structure of the character described comprising, in combination, a tire valve including a first valve member shiftable between a valve opening and a valve sealing position; and a combined protecting cap and pressure gauge assembly, said assembly comprising a valve body having a first end connected with said tire valve, an externally threaded second end, and defining therewithin a path for the flow of air between said first end and said second end, a control valve including a second valve member received in said valve body and reciprocable in said path between an open first position in which it shifts said first valve member to said valve opening position and a sealing second position in which it permits said first valve member to return to said valve sealing position, first resilient means mounted in said valve body for permanently biasing said second valve member to said second position, hand-actuated means comprising an internally threaded closing cap normally screwed onto the second end of said valve body, said closing cap formed with a venting channel communicating with said path and including an elastic insert movable by hand into engagement with said second valve member to move the latter to said first position and to thereby shift said first valve member to said valve opening position, said insert sealing said venting channel from said path when moved into engagement with said second valve member, said closing cap removable from said body to permit the connection of said second end with a source of compressed air so that air may flow in said path for shifting said first valve member to said valve opening position, and a pressure gauge comprising an extension connected with said valve body and including an at least partially transparent member, an element reciprocably received in said extension and having a side exposed to the action of compressed air in said path whereby said element may be moved by compressed air in a first direction, second resilient means for permanently biasing said element in a second direction counter to said first direction, and scale means provided on said transparent member for indicating the position of said element and for thereby indicating the air pressure prevailing in said path when the second valve member shifts said first valve member to said valve opening position.

4. A structure of the character described comprising, in combination, a tire valve including a first valve member shiftable between a valve opening and a valve sealing position; and a combined protective cap and pressure gauge assembly, said assembly comprising a valve body having a first end, a second end, and defining therewithin a path for the flow of air between said first end and said second end, means including a nut for connecting the first end of said valve body to said tire valve, a control valve including a second valve member received in said valve body and reciprocable in said path between an open first position in which it shifts said first valve member to said valve opening position and a sealing second position in which it permits said first valve member to return to said valve sealing position, first resilient means mounted in said valve body for permanently biasing said second valve member to said second position, hand-actuated means connected to the second end of said valve body and adapted to move said second valve member to said first position against the bias of said resilient means, said hand-actuated means removable from said valve body to permit the latter's connection to a source of compressed air so that air may flow in said path for shifting said first valve member to said valve opening position, and a pressure gauge comprising a tubular extension projecting from said valve body, a tubular cap member having an open end received in said extension and a closed end located externally of said extension, said cap member consisting at least in part of transparent material and provided with scale means on its portion extending from said extension, means for retaining said cap member in said extension, an element reciprocably received in said cap member and comprising a bottom portion, said valve body formed with a passage communicating with said path and leading to the bottom portion of said element so that said element may be moved in a first direction under the action of air pressure prevailing in said passage, and second resilient means operating between said cap member and said element for permanently biasing said element in a second direction counter to said first direction, the position of said element with respect to said scale means indicating the air pressure prevailing in said passage, said cap member and said extension defining a venting channel communicating with the interior of said cap member and with the atmosphere at a point close to and shielded by said nut.

5. A structure of the character described comprising, in combination, a tire valve including a first valve member shiftable between a valve opening and a valve sealing position; and a combined protective cap and pressure gauge assembly, said assembly comprising a valve body having a first end, a second end, and defining therewithin a path for the flow of air between said first end and said second end, means including a nut for connecting the first end of said valve body to said tire valve, a control valve including a second valve member received in said valve body and reciprocable in said path between an open first position in which it shifts said first valve member to said valve opening position and a sealing second position in which it permits sad first valve member to return to said valve sealing position, first resilient means mounted in said valve body for permanently biasing said second valve member to said second position, hand-actuated means connected to the second end of said valve body and adapted to move said second valve member to said first position against the bias of said resilient means, said hand-actuated means removable from said valve body to permit the latter's connection to a source of compressed air so that air may flow in said path for shifting said first valve member to said valve opening position, and a pressure gauge comprising a tubular extension projecting from said valve body, a tubular cap member having an open end received in said extension and a closed end located externally of said extension, said cap member consisting at least in part of transparent material and provided with scale means on its portion extending from said extension, means for retaining said cap member in said extension, an element reciprocably received in said cap member and comprising a bottom portion, said valve body formed with a passage communicating with said path and leading to the bottom portion of said element so that said element may be moved in a first direction under the action of air pressure prevailing in said passage, and second resilient means operating between said cap member and said element for permanently biasing said element in a second direction counter to said first direction, the position of said element with respect to said scale means indicating the air pressure prevailing in said passage, said cap member and asid extension defining a venting channel communicating with the interior of said cap member and with the atmosphere at a point close to and shielded by said nut, and an air filter provided in said venting channel.

References Cited in the file of this patent

UNITED STATES PATENTS

| 867,474 | Campbell | Oct. 1, 1907 |
| 986,672 | Barnard | Mar. 14, 1911 |
| 1,297,741 | Schweinert | Mar. 18, 1919 |
| 1,319,138 | Bowden | Oct. 21, 1919 |
| 2,001,233 | Anderberg | May 14, 1935 |
| 2,278,776 | Fowler | Apr. 7, 1942 |
| 2,906,282 | Shannon | Sept. 29, 1959 |

FOREIGN PATENTS

| 24,881 | Great Britain | Nov. 6, 1906 |